Aug. 30, 1932.                F. PRANTL                1,873,979
               ELECTRIC LOCOMOTIVE SPEED CONTROL SYSTEM
                          Filed April 29, 1930

Inventor
Franz Prantl
By Alfred H Dyson
Attorney

Patented Aug. 30, 1932

1,873,979

UNITED STATES PATENT OFFICE

FRANZ PRANTL, OF WETTINGEN, SWITZERLAND, ASSIGNOR TO AKTIENGESELLSCHAFT BROWN BOVERI & CIE., OF BADEN, SWITZERLAND, A JOINT-STOCK COMPANY OF SWITZERLAND

ELECTRIC LOCOMOTIVE SPEED CONTROL SYSTEM

Application filed April 29, 1930, Serial No. 448,221, and in Germany May 3, 1929.

This invention relates to improvements in traction motor control systems for electric railways.

In electric railway operation, when the distances between stations is comparatively short and the speed to be attained between stations is relatively high, the total running time between the stations is practically divided into an accelerating or starting period and a retarding or braking period. The time during which the traction motors operate at the full trolley wire voltage is, therefore, increasingly smaller as compared to the accelerating and retarding periods. The present day equipment for electric railways is very poorly adapted to the described type of operation because a great deal of energy is lost in the starting and braking resistances.

It is, therefore, among the objects of the present invention to provide a traction motor control system in which the starting and braking operations are performed with the minimum dissipation of energy in the resistances or in the mechanical brakes.

Another object of the present invention is to provide a traction motor control system for electric railways in which a motor generator set is used to regulate the speed of the vehicle in question.

Another object of the invention is to provide an electric railway vehicle driving system in which a motor generator set having fields adjustable in two directions, is used to supplement the trolley wire voltage supplied to the traction motors.

Figure 1:
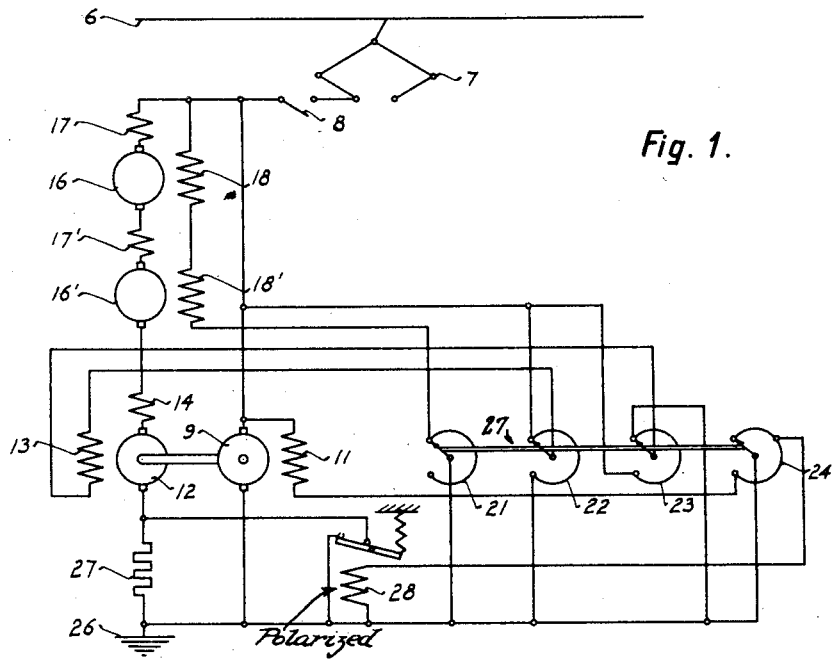

Objects and advantages, other than those above set forth, will be apparent from the following description when read in connection with the drawing in which Figure 1 diagrammatically illustrates one embodiment of a traction motor control system, according to the present invention, shown in the "off" position.

Figure 2:
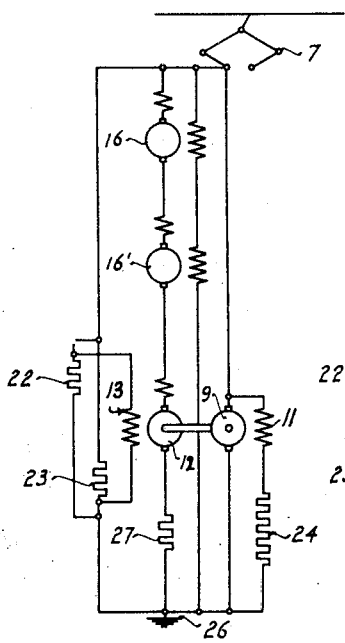
Figure 3:
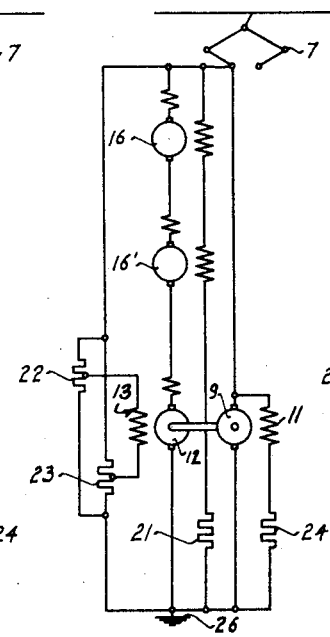
Figure 4:
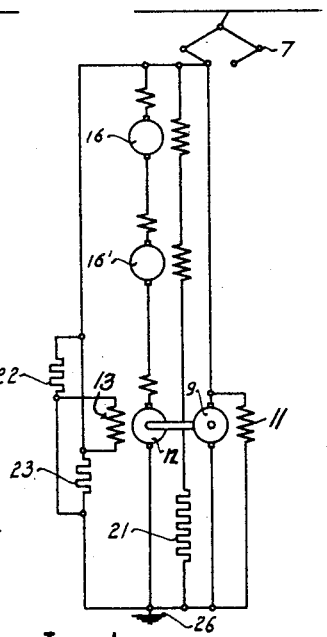

Fig. 2 diagrammatically illustrates the connections of the system in the starting position, Fig. 3 shows the circuits in the system when connected for half speed operation of the traction motors, and Fig. 4 shows the connections in the system for full speed operation of the traction motors.

Referring more particularly to the drawing by characters of reference, the reference numeral 6 designates a trolley wire from which current is taken by a suitable current collector such as a pantograph 7 which is connected through a switch 8 with the traction motors. The traction motors comprising the armatures 16, 16', the series field windings 17, 17' and the shunt field windings 18, 18'; are connected with a motor generator set of which both members may operate either as a motor or as a generator, dependent on the condition of the system as will be described hereinafter. One of the members of the motor generator set, which may be termed the motor element, comprises an armature 9 and a shunt field winding 11 while the other member of the motor generator set, which may be termed the generator element, includes an armature 12, a series field winding 14 and a shunt field winding 13.

As shown in Fig. 1 of the drawing, the shunt field windings 18, 18' of the traction motors are serially connected in circuit with rheostat 21; the field winding 11 of the motor generator set is serially connected in circuit with rheostat 24, and the shunt field winding 13 of the motor generator set is serially connected in circuit with rheostats 22, 23.

The contact arms of the rheostats 21, 22, 23 and 24 are arranged to be simultaneously operated by a common means such, for example, as rod 27, in such manner that, upon movement of the rheostat arms in a clockwise direction, the excitation of field coils 18, 18' are progressively decreased; the excitation of field coil 11 progressively increased; and the excitation of field coil 13 progressively decreased until the resistance of rheostat 22, included in circuit with the coil 13, is equal to the resistance of rheostat 23 included in circuit with coil 13, whereafter, the continued actuation of the contact arms of the respective rheostats in a clockwise direction causes progressive increase in the excitation of the coil 13 in an opposite direction as result of increase of resistance of rheostat 23, and decrease of resistance of rheostat 22 in circuit therewith.

The element 12 of the motor generator set is grounded, as at 26, through a resistance 27, which is short-circuited under certain conditions by a polarized voltage relay 28, the coil of which is connected with the rheostat 24 and with ground, as at 26.

In the operation of the system, when the switch 8 is closed, and with the arms of rheostats 21, 22, 23 and 24 in the position shown in Fig. 1 of the drawing, the coil of the polarized relay 28 is energized, its centrally pivoted armature thereby rotated in a counter-clockwise direction against tension of its biasing compression spring, which opens its contacts and removes the short circuit of the resistance 27 which was present in the arrangement of the system as shown in Fig. 1 and the system is then in the starting condition as shown in Fig. 2 whereby the traction motors operate at a low voltage and, therefore, at low speed without excessive current. The above results from the weakened condition of the field 11 of the member 9 of the motor generator set because of the adjustment of the rheostat 24 thereby causing the motor generator set to rotate at a relatively high speed. The member 12 of the motor generator set then produces a large counter E. M. F. which is reinforced by connection of the shunt field 13 across the full line voltage. The shunt fields 18, 18′, of the traction motors are also connected across the full line voltage and the resistance 27 is connected to limit the starting current through the traction motors and generator armature 12. A resistance may be, similarly, connected in circuit of the armature 9 when found necessary or desirable to limit the initial starting current. However, the starting of motor 9, 11, being at substantially no load, the speed thereof will increase at such a rapid rate as not to necessitate, ordinarily, the inclusion of a current limiting resistance in the circuit of the armature 9 thereof. The speed of the traction motors is progressively increased to an intermediate value as for example, half speed, by adjusting the rheostat arms progressively in a clockwise direction to produce the circuit conditions illustrated in Fig. 3 of the drawing. In this position of the rheostat, the shunt field winding 11 is strengthened by reducing the effective amount of the resistance of rheostat 24. The excitation of the shunt field 13 is now reduced to zero by connection with equi-potential points of the rheostats 22 and 23, and the shunt fields 18, and 18′ are weakened by increasing the resistance of the rheostat 21 in circuit therewith. The connections may be so designed that, at this point, the speed of the motor generator set is such that it does not produce an appreciable voltage. The resistance 27 is now short circuited by the relay 28 and the voltage on the traction motors is therefore increased thereby increasing their speed.

Further progressive adjustments of the rheostat arms in a clockwise direction, beyond the positions thereof establishing the circuit conditions according to Fig. 3, of the drawing, up to and including the positions thereof establishing the circuit conditions according to Fig. 4, of the drawing, progressively increases the effective resistance of rheostat 21 and progressively decreases the effective resistance of rheostat 24, which operate to progressively decrease the excitation of fields 18, 18′ and progressively increases the excitation of field 11. Such progressive adjustments of the rheostat arms operate also to so vary the effective resistance of rheostats 22 and 23 in such manner as to cause reversal of direction of flow of current in field 13 with consequent reversal of the voltage delivered by the armature 12. The motor-generator set now functioning as a booster, the voltage delivered to the traction motors is higher than the line voltage which, together with the decreasing excitation of the fields 18, 18′, causes the speed of the traction motors to progressively increase up to the maximum clockwise adjustment of the rheostat arms establishing the circuit conditions shown by Fig. 4 of the drawing.

If the rheostat arms be now adjusted in a counter-clockwise direction, to any position between the position thereof establishing the circuit conditions as shown by Fig. 4, of the drawing and the circuit conditions shown by Fig. 3 of the drawing, the traction motors are caused to operate as series connected compound generators delivering energy to the line and thereby producing regenerative braking action, until the speed of the traction motors is reduced to such a rate that the voltage delivered thereby is approximately equal to the line voltage. During such operation of the traction motors as generators, the generator elements 12, 13, 14, operate as a motor driving the element 9 as a generator which also delivers energy to the line. If the rheostat arms be then further adjusted, in a counter-clockwise direction, to any position between the position establishing the circuit conditions as shown by Fig. 3 of the drawing and the position establishing the circuit conditions shown by Fig. 2 of the drawing, the traction motors are again caused to operate as series connected compound generators and deliver energy to the line, thereby again producing regenerative braking action until the speed thereof is reduced to such a rate that the sums of the voltages delivered to the line by the traction motors and the element 12 (now operating as a compound generator as described with respect to the adjustment of the rheostat arms in a clockwise direction from the position establishing the circuit conditions according to Fig. 2 of the drawing to the position according to Fig. 3 of the drawing) is approximately equal to the line voltage.

When the trolley voltage is high, the generator of the motor generator set may comprise two or more machines connected in series to reduce the amount of insulation required and the generator may either continue to run or may be shut off, during longer periods of stopping at stations, as may be desired. If a plurality of traction motors are to be used, as in a locomotive or a motor car, the occurrence of a defect in one of the motors is not serious because such defective motor may simply be disconnected and the remaining motors may be operated without change in the control system. If, however, only two traction motors are used, and one is disconnected, the controller should not be moved beyond the middle position so as not to impress an excessive voltage on the remaining motor.

Among the advantages to be derived from the present invention are the fact that a very material energy economy is obtained, that a continuous variation of speed and of tractive efforts can be obtained although a connection of traction motors from series to parallel or intermediate connections are no longer necessary, and the control equipment can be operated for an indefinite length of time whatever its connection; each step of the controller thus becoming a running position. When the trolley wire voltage changes very slowly or remains substantially constant, a pure shunt motor or a weakly compounded motor or an oppositely compounded motor or an oppositely compounded generator may be used. This is very frequently desired particularly in switching locomotives or motor cars which derive their current from a battery whereby the size of the battery may be decreased or the same size of battery may be operated for a longer length of time without being recharged.

Although but one embodiment of the present invention has been illustrated and described, it will be apparent to those skilled in the art that various changes and modifications may be made therein without departing from the spirit of the invention or from the scope of the appended claims.

The invention claimed is:

1. In a control system for electrically-driven vehicles, the combination with a source of current supply, a motor generator set having a motor element and a generator element connected with said source, and a traction motor serially connected in circuit with the said generator element and said source, each of said elements and the said motor having shunt field coils connected with said source, of means disposed to simultaneously and progressively vary the excitation of each of said coils, the said variations being effected in such manner that during the progressive decrease in excitation of the said coil of the traction motor the excitation of the said coil of the motor element of the motor generator set is increased and vice versa.

2. In a control system for electrically-driven vehicles, the combination with a source of current supply, a motor generator set having a motor element and a generator element connected with said source, and a traction motor serially connected in circuit with the said generator element and said source, each of said elements and said motor having shunt field coils connected with said source, of means disposed to simultaneously and progressively vary the excitation of each of said coils, the said variations being effected in such manner that during the progressive decrease in excitation of the said coil of the said traction motor, the excitation of the said coil of the said generator element is first progressively decreased to zero value and thereafter progressively energized in inverse direction.

3. In a control system for electrically-driven vehicles, the combination with a source of current supply, a motor generator set having a motor element and a generator element connected with said source, and a traction motor serially connected in circuit with the said generator element and said source, each of said elements and the said motor having shunt field coils connected with said source, of means disposed to simultaneously and progressively vary the excitation of each of said coils to cause inverse speed variation of the said motor element and the said traction motor, the said means including means to vary the direction and degree of excitation of the said field coil of the said generator element simultaneously with variations in the said excitation and the speed of the said motor element to further vary the speed of the said traction motor.

4. In a control system for electrically-driven vehicles, the combination with a source of current supply, a variable speed traction motor having a series field coil and a shunt field coil, a motor generator set having a motor element comprising a shunt field coil and a generator element having a series field coil and a shunt field coil, the said traction motor and said generator element being serially connected in circuit with the said source in such manner as to cause the output potential of the said generator element to normally oppose the potential of the said source of supply, of means for progressively accelerating the speed of the said traction motor comprising progressively reducing the excitation of the shunt field coil thereof and simultaneously increasing the excitation of the said field coil of the said motor element to reduce the speed thereof and thereby progressively decrease the output potential of the said generator element, the said means including means for simultaneously and progressively decreasing the excitation of the said shunt field coil of the said generator element down to zero value, and for thereafter progressively increasing the excitation of the last said coil in direction to cause reversal in direction of the output potential of the said generator element whereby the rate of acceleration of the said traction motor may be increased.

In testimony whereof I have hereunto subscribed my name this 17th day of April A. D. 1930.

FRANZ PRANTL.